Nov. 7, 1933.  R. T. STEINDORF  1,934,616
MEANS FOR PROTECTING SUBMERGED JOURNAL BEARINGS
Filed Nov. 2, 1931
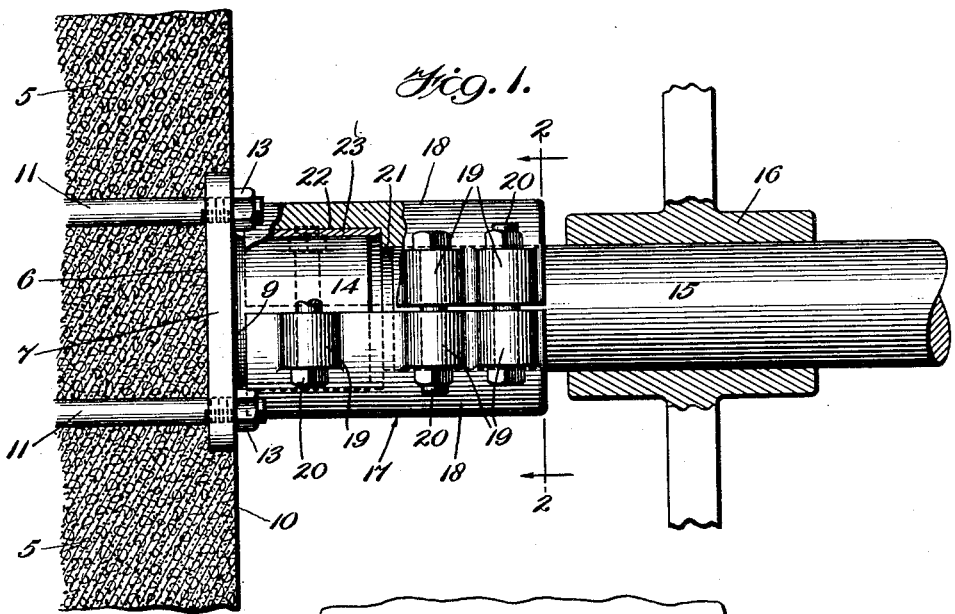
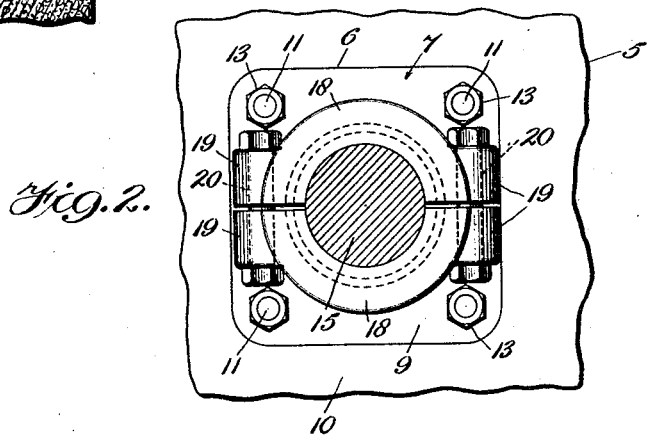
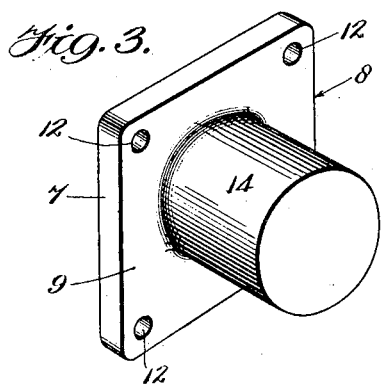
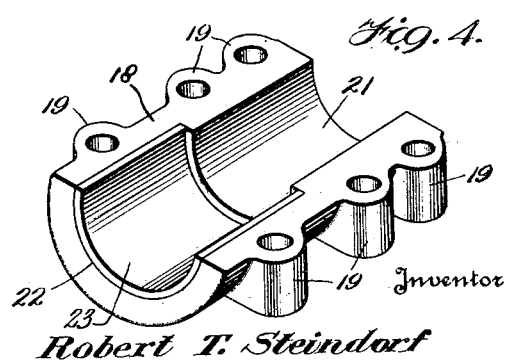
Inventor
Robert T. Steindorf
By Barker & Colling
Attorneys Patented Nov. 7, 1933

1,934,616

UNITED STATES PATENT OFFICE 1,934,616

MEANS FOR PROTECTING SUBMERGED JOURNAL BEARINGS

Robert T. Steindorf, Milwaukee, Wis., assignor to Chain Belt Company, Milwaukee, Wis., a corporation of Wisconsin Application November 2, 1931. Serial No. 572,695

2 Claims. (Cl. 308—15)

This invention relates to means for preventing the accumulation of solids upon submerged shaft bearings and has for one of its objects to provide a device of this character which will be simple in construction, comparatively inexpensive to manufacture and install and more efficient in use than those which have been heretofore proposed.

The present invention has been primarily designed for use in connection with the settling tanks of sewage disposal apparatus and while not wholly limited thereto has been here illustrated and will be described in connection with such apparatus.

One well known form of sewage disposal apparatus comprises one or more settling tanks which are usually constructed of concrete and in which there is ordinarily provided suitable apparatus for removing the settled solids from the bottom of the tank. Such sludge removers may consist of endless traveling chains or belts carrying transverse flights, the chains or belts being trained about sprocket wheels mounted on shafts extending transversely of the tank, and the flights during their lower run scraping over the bottom of the tank and removing the deposited solids therefrom. The bearings in which the said shafts are journalled are ordinarily supported from the side walls of the tank and are submerged in the solid-carrying liquid. Under such conditions the solids, as they settle downwardly in the process of coagulation, tend to deposit upon any stationary parts within the liquid and build up accumulations thereon. In sewage disposal such deposits are detrimental in that as soon as the settling solids come to rest putrefaction is accelerated, with its attendant disagreeable odors. On the other hand, the solids will not deposit upon moving parts such as the rotating shafts and sprockets, and therefore if the journal bearings of such shafts, which of course are stationary, be protected by a moving part carried for example, by the shaft, the accumulation of putrefactive solids upon such bearings may be eliminated.

The present invention therefore has for its principal object the provision of a journal bearing constructed for use in sewage disposal and similar apparatus in which the journal bearings of the shafts are substantially completely protected against the deposit and accumulation or solids thereon.

With the above and other objects in view which will appear as the description proceeds, the invention consists in the novel details of construction and combinations of parts more fully hereinafter described and particularly pointed out in the appended claims.

Referring to the accompanying drawing forming a part of this specification in which like reference characters designate like parts in all the views:—

Figure 1 is a fragmentary vertical sectional view through a wall of a tank or receptacle, such for example as the settling tank of a sewage disposal system, with a journal bearing constructed in accordance with the present invention associated therewith;

Figure 2 is a transverse sectional view taken approximately on the plane indicated by the line 2—2 of Figure 1, looking in the direction of the arrows;

Figure 3 is a detail perspective view of the fixed journal member; and

Figure 4 is a perspective view of one of the bearing sleeve sections, a pair of which are clamped to the end of the sprocket-carrying shafts and engage the journal member to not only form a bearing for the shaft but also to protect the fixed journal member against the deposit of solids thereon.

In the said drawing 5 indicates a vertical wall of a settling tank, which as above mentioned is usually formed of concrete, which wall is recessed as at 6 to receive flange 7 of journal member 8. The recess 6 of the wall 5 is of such dimensions that the flange 7 will fit snugly therein with its outwardly facing surface 9 substantially flush with the corresponding surface 10 of the wall, as clearly shown in Figure 1. In this manner the flange is protected against the deposit of solids thereon as will be readily understood. Suitable attachment bolts or studs 11 are embedded in the concrete wall 5 and their free ends project through apertures 12 formed in the flange 7 and receive nuts 13 whereby the journal member is rigidly secured in place. The said journal member 8 in addition to the flange 7 comprises a projecting stud 14 rigid with the said flange 7 as will be clear from Figures 1 and 3.

The shaft 15 which carries the sprocket wheel 16 is journalled upon the said stud 14 by means of a sleeve 17 arranged at the end of the said shaft. The said sleeve may be an integral tubular member suitably secured to the end of the shaft but it is preferred, for facilitating assembly, to make it in the form of a split sleeve composed of two half sections 18 which may be identical in construction. The said sections are provided with ears or lugs 19 through which bolts 20 are passed to clamp that portion 21 of the bore of the sleeve sections upon the shaft end as clearly shown in Figure 1. The other end 22 of the said bore, which may be enlarged as shown, is provided with the babbit or other anti-friction bushing 23 and receives the stud 14 and rotates thereon to form the journal bearing for the shaft. A slight amount of clearance may be provided axially to permit end play of the shaft but as will be readily understood from Figures 1 and 2 the walls of the sleeve substantially completely surround the fixed stud 14 and protect it against the deposit of putrefactive solids thereon.

As above stated, the member 17 may if desired be of an integral tubular construction, in which event it will be slid axially upon the shaft end until its left hand end, as viewed in Fig. 1, is approximately in line with the shaft end, and after the shaft has been brought into axial alinement with the stud 14, the tubular member will be slid toward the left, as viewed in said figure, to embrace the said stud, just as does the split form shown. The member will then be secured to the shaft end in any appropriate manner.

As above explained these solids do not accumulate upon moving parts and since the sleeve rotates with the shaft its surfaces are not subject to such deposits. It therefore follows that such surfaces of the journal bearing as are subject to such deposits are adequately protected.

It is obvious that those skilled in the art may vary the details of construction as well as the precise arrangement of parts without departing from the spirit of the invention, and therefore it is not wished to be limited to the above disclosure except as may be required by the claims.

What I claim is:

1. In a settling tank for sewage and the like having side walls, bearing-studs projecting in alignment from opposite walls of said tank; a shaft in alinement with said studs; and readily removable means on the ends of said shaft, enclosing said studs to journal the shaft thereon thereby preventing the deposit of settling solids upon them.

2. In a settling tank for sewage and the like having side walls, bearing studs projecting in alinement from opposite walls of said tank; a shaft in alinement with said studs; and shiftable tubular members secured on the end portions of said shaft and embracing said studs to journal the shaft thereon thereby preventing the deposit of settling solids upon them.

ROBERT T. STEINDORF.